Aug. 2, 1955
V. BALASS
2,714,518
COUPLING FOR HOSES OR PIPES
Filed Aug. 25, 1953
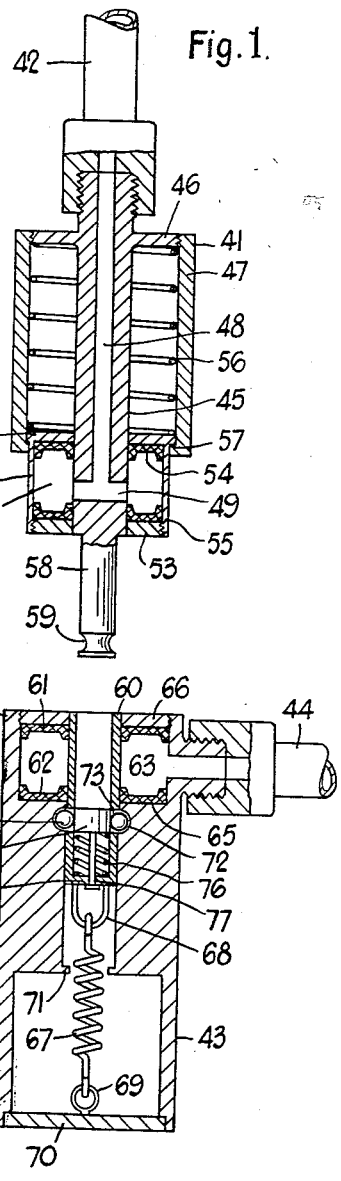
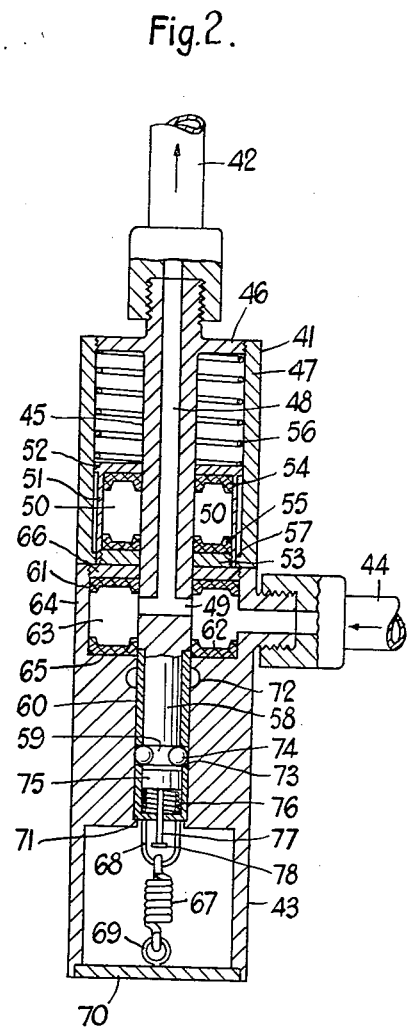
INVENTOR,
VALENTIN BALASS.
BY Benjamin Noman,
Atty.

United States Patent Office 2,714,518
Patented Aug. 2, 1955

2,714,518
COUPLING FOR HOSES OR PIPES

Valentin Balass, Zurich, Switzerland, assignor to Tecno Trade Anstalt, Mauren, Liechtenstein, a corporation of Liechtenstein Application August 25, 1953, Serial No. 376,475

Claims priority, application Switzerland January 17, 1953

2 Claims. (Cl. 284—16)

This invention relates to a coupling for hoses or pipes having an automatic shut-off device which opens on coupling and shuts off the two sections of the coupling on disconnecting. The present invention consists in that the one section of the coupling has a shut-off device which, when the coupling is disconnected, shuts off said section and which shut-off device is provided with a connecting channel leading to the hose or pipe of said section and, furthermore, that the other section of the coupling also has a shut-off device which when the coupling is disconnected shuts off said second section and which, when coupled, is in outward appearance an extension of the shut-off device of the first section of the coupling, and in that, on coupling, the shut-off device of the second coupling section is capable of being displaced to such an extent by the shut-off device of the first section of the coupling entering into the second section of the coupling that a connection through the connecting channel is effected between the hoses or pipes joined respectively to the first and second section of the coupling.

With the coupling of the present invention it is possible to connect and separate again two hydraulic or pneumatic systems without loss of pressure or fluid, or air respectively. The hereindescribed coupling is therefore, particularly suitable for connecting the hydraulic braking system of a trailer to that of a motor vehicle since, when the coupling is disconnected, whether intentionally or unintentionally, the pressure and the quantity of the brake fluid remain unchanged in the two systems. In consequence the action of the brakes of the motor vehicle is in no way impaired, and likewise the brake system of the trailer is also always in working condition and can quickly be reconnected to the braking system of the motor vehicle.

According to a further feature of the invention, the shut-off device of the second section of the coupling is loaded by a spring which tends to shift said shut-off device into the open position whereas, with the coupling disconnected, said shut-off device is retained by a catch mechanism in the closed position. Furthermore the shut-off device of the first section of the coupling is provided with an element functioning as a key which when the two sections of the coupling are joined, disengages the catch mechanism and mechanically connects the two shut-off devices so as to enable the spring to displace the two shut-off devices sufficiently to effect the connection between the hoses or pipes, attached respectively to the first and second section of the coupling, through the shut-off device of the first section entering into the second section of the coupling.

Such a construction of the coupling has the advantage that it is only necessary to initiate the process of coupling, and this in the most simple manner, since only the insertion of the key-like element of the first section of the coupling into the second section is needed for the instantaneous completion of the process. The invention, therefore, guarantees a faultless automatic connection of the two sections of the coupling even if the coupling is done carelessly or under difficult conditions.

In order to enable the invention to be more readily understood, reference is made to the accompanying drawings which illustrate diagrammatically and by way of example, an embodiment thereof intended for use in coupling a motor vehicle to a trailer and in which:

Fig. 1 is an axial section of an embodiment showing the coupling disconnected and Fig. 2 is an axial section of the embodiment shown in Fig. 1 illustrating the coupling in the connected position.

In the embodiment illustrated, conduit 42 supplying brake fluid to the hydraulic brake system (not shown) of the trailer is connected to the coupling section 41, while conduit 44 joined to the main cylinder (not shown) of the hydraulic braking system of the motor vehicle is connected to coupling section 43. Coupling section 41 has a cylindrical shut-off device 45 which by means of partition 46 is secured to the cylindrical casing 47. Shut-off device 45 has a longitudinal bore 48 to the one end of which opens into conduit 42 while the other end opens into the transverse bore 49. With the coupling disconnected, bore 49 opens with its two ends into an annular chamber 50 which is formed by a casing comprising a cylindrical wall 51 and two end walls 52, 53. Chamber 50 is sealed off by two gaskets 54, 55 surrounding the shut-off device 45. The brake fluid passing from conduit 42 through bores 48, 49 into chamber 50 and, under normal conditions, filling it, remains shut-off in chamber 50 since shut-off device 45 prevents the brake fluid from flowing out. When the coupling is disconnected, the coupling section 41 is sealed by shut-off device 45 so that no brake fluid can escape from the braking system of the trailer through the shut-off device. Disconnecting the coupling therefore causes no pressure loss in the hydraulic braking system of the trailer.

Between walls 46 and 52 is interposed a compression spring 56 which presses wall 52 against stop 57 of casing 47.

Shut-off device 45 has, protruding from coupling section 46, an element 58, functioning as a key, in the form of a cylindrical pin with a smaller diameter than the diameter of the main part of shut-off device with bore 49. Element 58 has at its outward end an annular recess 59.

The other coupling section 43 has a shut-off device 60 in the form of a tube which is sealed by the two surrounding gaskets 61, 62. Between the gaskets 61, 62 there remains an annular chamber 63 which is bounded at its circumference by the cylindrical casing 64 of coupling section 43. The annular face 65 of casing 64 serves as supporting face for gasket 62. Gasket 61 rests on the annular end wall 66 whose outer face is provided with a packing (not shown). Space 63 is filled with brake fluid since it is directly connected to conduit 44 which supplies the brake fluid coming from the main cylinder (not shown). When the coupling is disconnected, the coupling section 43 is tightly sealed by shut-off device 60 so that no brake fluid from the braking system of the motor vehicle can escape therethrough. Disconnecting the coupling therefore causes no pressure drop in this hydraulic system.

Shut-off device 60 is loaded by tension spring 67 which is inserted between bracket 68 of shut-off device 60 and ring 69 of end wall 70 of casing 64 so that this spring 67 constantly tends to shift the shut-off device 60 into the open position at stop 71 of casing 64. However, if the coupling is disconnected, shut-off device 60 is retained in the closed position (shown in Fig. 1) by a ball catch consisting of the recess 72 in casing 64, recesses 73 in shut-off device 60, and balls 74 held in said recesses. With half of their diameters the balls 74 are placed in recess 72 and with the other half in recesses 73, and since the depths of recesses 72 and 73 exceed the diameter of balls 74 only by the necessary clearance, the balls prevent a shifting of shut-off device 60 into the open position when the coupling is disconnected. The recesses 73 are closed by a cylindrical element 75 which is loaded by spring 76 and is maintained in the correct position by rod 77 and stop 78 so that balls 74 when the coupling is disconnected cannot come out from the hollow space formed by recesses 72 and 73.

In order to connect conduits 42 and 44 by means of the coupling device (Fig. 2) it is merely necessary to insert the key-like element 58 of coupling section 41 into the tubular shut-off device 60 of coupling section 43 until the locking element displaced by element 58 exposes the recesses 73 and thus disengages the catch 72, 73, 74 since the balls 74 snap out from recess 72. However recess 59 has now taken the place of locking element 75 so that balls 74 snap into recess 59 and remain with half their diameters in recesses 73 so that now balls 74 mechanically join the shut-off devices 45 and 60. Since in this way the catch 72, 73, 74 is disengaged and the shut-off devices 45, 60 on the other hand form a single unit with the same diameter, spring 67 shifts the two shut-off devices 45, 60 up to stop 71. Overcoming the tension of pressure spring 56 the casing 51, 52, 53 which surrounds chamber 50 is pressed flush into casing 47 so that the two casings 47, 64 are brought flush together separated by a packing (not shown) and at the same time bore 49 penetrates into chamber 63 whereby the intended connection between the two conduits 42, 44 is effected.

In order to disconnect the coupling, the two coupling sections 41, 43 are drawn away from one another. This causes the connected shut-off devices 45, 60 to be removed from stop 71 and the spring 67 to be stretched. As soon as in this displacement of the connected shut-off devices 45, 60 the recesses 73 have arrived at recess 72, the balls 74 snap into said recess 72 with the result that on the one hand shut-off device 60 is stopped in its closed position (Fig. 1) and, on the other hand, the connection between the two shut-off devices 45, 60 is broken so that now the two coupling sections 45, 60 can be separated from one another.

It is obvious that the tension spring 67 can be replaced by a built-in compression spring.

The aforedescribed design of the coupling, and especially that of the shut-off devices enables the parts of the two coupling sections which face each other to be formed as plane sealing faces extending from the periphery of casings to the shut-off devices so that on connecting and disconnecting the coupling the transverse bore 49 in Fig. 1 can be moved to and fro between the sealed chambers 50, 63 in Fig. 1 without passing through another hollow space which would be filled with fluid to be lost at the latest when the coupling is disconnected. Moreover, the shut-off devices have, especially when compared with valves, the advantage of a simple construction and of being little subject to trouble. The hereindescribed coupling is thus distinguished by a relatively simple construction and by great reliability in operation.

The construction illustrated in the drawings can be modified by making the chambers 50, 63 of Fig. 1 of such a small diameter as to leave between the corresponding shut-off devices and the cylindrical walls surrounding them, only a clearance permitting the movement of said shut-off devices. Instead of the cuff-like gaskets illustrated, sealing rings of rubber or another resilient material can then be provided, which are inserted in annular recesses either of the shut-off devices or of the cylindrical walls surrounding them.

I claim:

1. A fluid conduit coupling comprising a first section and a second section; said first section having an axial bore therein, a chamber surrounding said bore and having a radial passageway extended outwardly for connection to a fluid conduit, a tube slidably mounted in said bore, recesses in said bore and through said tube wall, said recesses being in register when said sections are uncoupled, balls in said recesses to lock said tube in said bore when the recesses are in register and to hold said tube in a position sealing said chamber from said bore, a spring urged member in said tube maintaining said balls in said locking position, and a spring between said section and said tube urging said tube away from said sealing position; said second section having a rod, said rod having an axial passageway adapted to be coupled at one end to a fluid conduit and terminating at the other end in radial ports leading to the exterior of said rod, a casing defining a chamber slidably mounted on and surrounding said rod; a spring urging said casing to a position sealing said radial ports; said rod having a key portion extending beyond said ports, said key portion having an annular recess in the surface thereof; in the coupled position of said sections, said spring urged member in the first section being forced from said locking position by said key portion in said second section, said balls in said first section being received in the recesses in the key portion and in said tube whereby the tube is moved from sealing position by said rod and the casing in said second section is moved from sealing position by the end of the first section.

2. A fluid conduit coupling comprising a first section and a second section; said first section having an axial bore therein, a chamber adjacent to said bore and including a radial passageway extended outwardly for connection to a fluid conduit, a device slidably mounted in said bore for sealing said chamber from said bore when the sections are uncoupled, releasable means for locking said device against movement when it is in the sealing position, and a spring between said section and device urging said device away from said sealing position; said second section having a rod, said rod having an axial passageway adapted to be coupled at one end to a fluid conduit and terminating at the other end in radial ports leading to the exterior of said rod, a casing slidably mounted on and surrounding said rod; a spring urging said casing to a position sealing said radial ports; said rod having a key portion extending beyond said ports; in the coupled position of said sections, said key portion being adapted to release said locking means and to engage itself with said slidable device whereby the latter is moved from sealing position by said rod and the casing in said second section is moved from sealing position by the end of the first section.

References Cited in the file of this patent

UNITED STATES PATENTS

| 2,393,679 | Gunderson | Jan. 29, 1946 |
| 2,453,741 | Bopp | Nov. 16, 1948 |
| 2,545,796 | Scheiwer | Mar. 20, 1951 |
| 2,553,680 | Scheiwer | May 22, 1951 |

FOREIGN PATENTS

| 678,556 | Great Britain | Sept. 3, 1952 |
| 683,003 | Great Britain | Nov. 19, 1952 |